No. 819,370. PATENTED MAY 1, 1906.
P. NOACRE.
GAGE.
APPLICATION FILED APR. 4, 1905.

Witnesses
G. E. Cilley
A. Allgier.

Inventor
Paul Noacre
By Gabriel J. Cilley
Attorney

UNITED STATES PATENT OFFICE.

PAUL NOACRE, OF GRAND RAPIDS, MICHIGAN.

GAGE.

No. 819,370. Specification of Letters Patent. Patented May 1, 1906.

Application filed April 4, 1905. Serial No. 253,900.

*To all whom it may concern:*

Be it known that I, PAUL NOACRE, a citizen of the United States, residing at Grand Rapids, in the county of Kent and State of Michigan, have invented certain new and useful Improvements in Gages, of which the following is a specification.

My invention relates to improvements in gages for measuring and repairing type matrices or molds from which type are cast in linotype-machines; and its objects are, first, to provide a gage with which minute differences of size or space may be measured without in any way changing the gage; second, to provide such a gage that will accurately measure the distance between the lateral lugs or projections by which the matrix is supported in the linotype-machine, and, third, to provide such a gage that will accurately measure the width of each of these lugs. I attain these objects by the mechanism illustrated in the accompanying drawings, in which—

Figure 1:
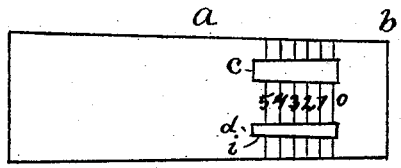
Figure 2:
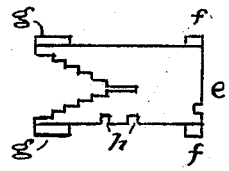

Figure 1 is a plan of the gage, partly in perspective. Fig. 2 is a plan of a matrix.

Similar letters refer to similar parts throughout both views.

$a$ represents the gage, and the end between $a$ and $b$ tapers so gradually that the lines 0 1 2 3 4 5 in Fig. 1 each represent a variation of, say, the one-thousandth of an inch, 0 representing the normal or absolute width that the matrix measures between the lugs $f$ and $g$ and two tapering slots, of which $c$ is designed to measure the width of the lugs marked $f$, and $d$ is designed to measure the width of the lugs marked $g$, and these slots are in position to utilize the gage-lines 0 1 2 3 4 5 similar to the end $b$, except that the incline is reversed, the normal line 0 representing the normal width of the respective lugs, and the successive following lines indicate the amount that has been worn off of the ends of the lugs, or, in other words, how much narrower they may have worn in thousandths. The object of reducing this gage to so minute a measurement and of providing it with the three sets of minute measurements or gages is that the matrix must be and remain exact to the minutest fraction not only between the lugs $f$ and $g$, but the lugs themselves must be kept minutely accurate in width to avert the danger of throwing the letters out of alinement.

The imprint, impress, or mold for the letters is at the bottom of the notches $h$, (see Fig. 2,) and the necessity of keeping the several measurements absolutely correct is to keep these notches in their exact proper positions, which insures perfect alinement of the letters in each and every word, and as the wear is upon the inner edges of the lugs it is evident that any variation in the distance between the lugs must arise from wear from the inner end of one or the other, or both, of the lugs, and when this is ascertained the lug or lugs that have been worn short may be peened or drawn with a hammer to the proper measurements.

For the purpose of insuring accuracy of alinement I place a slot, as $i$, in the body of the gage, one edge of which will be in the exact position to establish the perfect alinement of the letter from one end of one of the notches $h$, the distance from this slot to the edge of the gage, on the line 0, being the exact distance that the side of the lug is from the line of type.

I prefer that the thickness of the plate $a$ be exactly the same as the length of the lugs, as by this means it will serve as a gage for insuring the proper length of the lugs when readjusting them.

Having thus fully described my invention, what I claim as new, and desire to secure by Letters Patent, is—

In a gage for measuring matrices for linotype-machines, a thin plate uniformly tapered, edgewise, toward the end and having slots uniformly tapered toward the opposite direction, and alined graduations indicating the measurements both at the edges of the plate and in the slots, substantially as and for the purpose set forth.

Signed at Grand Rapids, Michigan, March 22, 1905.

PAUL NOACRE.

In presence of—
ITHIEL J. CILLEY,
A. S. PALMER.